(12) United States Patent
Han et al.

(10) Patent No.: US 9,897,733 B2
(45) Date of Patent: Feb. 20, 2018

(54) SPATIAL LIGHT MODULATOR INCLUDING NANO-ANTENNA ELECTRODE AND DISPLAY APPARATUS INCLUDING THE SPATIAL LIGHT MODULATOR

(71) Applicant: SAMSUNG ELECTRONICS CO., LTD., Suwon-si (KR)

(72) Inventors: Seunghoon Han, Seoul (KR); Kanghee Won, Seoul (KR); Hongseok Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 297 days.

(21) Appl. No.: 14/614,912

(22) Filed: Feb. 5, 2015

(65) Prior Publication Data

US 2015/0331297 A1 Nov. 19, 2015

(30) Foreign Application Priority Data

May 16, 2014 (KR) .................. 10-2014-0059305

(51) Int. Cl.
*G02F 1/19* (2006.01)
*G03H 1/22* (2006.01)
(Continued)

(52) U.S. Cl.
CPC ............. *G02B 5/30* (2013.01); *G02B 5/3058* (2013.01); *G02B 27/22* (2013.01);
(Continued)

(58) Field of Classification Search
CPC .......... G02B 5/30; G02B 5/3058; G02B 7/22; G02B 27/2214; G02F 1/134363; G02F 1/19; G03H 1/2294
(Continued)

(56) References Cited

U.S. PATENT DOCUMENTS 7,605,897 B2 * 10/2009 Lu ..................... G02F 1/133707
349/123
8,405,810 B2 * 3/2013 Koh .................. G02F 1/134363
349/141
(Continued)

FOREIGN PATENT DOCUMENTS

KR 10-2012-0077417 A 7/2012
KR 10-1251379 B1 4/2013
(Continued)

OTHER PUBLICATIONS

Ni et al., "Metasurface holograms for visible light", Nov. 15, 2013, 6 pages total, Nature Communications, West Lafayette, Indiana, USA.
(Continued)

*Primary Examiner* — Bumsuk Won
*Assistant Examiner* — Grant Gagnon
(74) *Attorney, Agent, or Firm* — Sughrue Mion, PLLC

(57) ABSTRACT

A spatial light modulator including an electrode having a nano-antenna structure, and a display apparatus including the spatial light modulator are provided. The spatial light modulator includes a refractive index changing layer, and a pixel electrode and a common electrode which are configured to apply an electric field to the refractive index changing layer, and at least one of the pixel electrode and the common electrode include a nano-antenna pattern structure configured to resonate light.

19 Claims, 6 Drawing Sheets

(51) Int. Cl.
- *G02B 5/30* (2006.01)
- *G02B 27/22* (2006.01)
- *G02F 1/1343* (2006.01)
- *B82Y 20/00* (2011.01)
- *G03H 1/02* (2006.01)

(52) U.S. Cl.
CPC ... *G02B 27/2214* (2013.01); *G02F 1/134363* (2013.01); *G02F 1/19* (2013.01); *G03H 1/2294* (2013.01); *B82Y 20/00* (2013.01); *G03H 2001/0224* (2013.01); *G03H 2225/22* (2013.01); *Y10S 977/952* (2013.01)

(58) Field of Classification Search
USPC .......................................................... 359/9
See application file for complete search history.

(56) References Cited

U.S. PATENT DOCUMENTS

| | | | | |
|---|---|---|---|---|
| 2005/0018150 | A1* | 1/2005 | Kamijima | G02B 5/045 353/100 |
| 2010/0232000 | A1* | 9/2010 | Futterer | G02B 26/005 359/9 |
| 2011/0235149 | A1* | 9/2011 | Ko | G02F 1/0327 359/263 |
| 2012/0170097 | A1* | 7/2012 | Han | B82Y 20/00 359/238 |
| 2013/0021545 | A1* | 1/2013 | Song | G02B 26/06 349/15 |
| 2014/0268264 | A1* | 9/2014 | Lee | G03H 1/2294 359/21 |
| 2014/0292588 | A1* | 10/2014 | Yoon | H01Q 1/2266 343/702 |
| 2014/0333977 | A1* | 11/2014 | Hwang | G03H 1/2294 359/9 |

FOREIGN PATENT DOCUMENTS

| | | |
|---|---|---|
| KR | 10-2013-0096523 A | 8/2013 |
| KR | 10-1301969 B1 | 8/2013 |

OTHER PUBLICATIONS

Abb et al., "All-Optical Control of a Single Plasmonic Nanoantenna-ITO Hybrid", NANO Letters, 2011; 7 pages total, Southhampton, United Kingdom.

* cited by examiner

SPATIAL LIGHT MODULATOR INCLUDING NANO-ANTENNA ELECTRODE AND DISPLAY APPARATUS INCLUDING THE SPATIAL LIGHT MODULATOR

CROSS-REFERENCE TO RELATED APPLICATION(S)

This application claims priority from Korean Patent Application No. 10-2014-0059305, filed on May 16, 2014, in the Korean Intellectual Property Office, the disclosure of which is incorporated herein in its entirety by reference.

BACKGROUND

1. Field

Apparatuses and methods consistent with exemplary embodiments relate to a spatial light modulator, and more particularly, to a spatial light modulator that is manufactured in a very small size and includes an electrode that has a nano-antenna structure, and a display apparatus including the spatial light modulator.

2. Description of Related Art

Modulation is used to alter one or more properties of a transmission signal. A spatial light modulator may be used to transmit or block incident light, control the intensity or the phase of light, and the like, which passes through the spatial light modulator. As an example, a spatial light modulator may be variously manufactured as a semiconductor-based spatial light modulator using an electro-absorption effect, a spatial light modulator using liquid crystal, and the like.

Generally, a spatial light modulator has a liquid crystal design that includes a plurality of pixels having a structure in which a liquid crystal is disposed between two electrodes. When an electric field is generated in the liquid crystal by applying a voltage to the two electrodes in each pixel, an orientation of liquid-crystal molecules changes along a direction of the electric field. As a result, a phase and a polarization direction of light proceeding from the liquid crystal change according to the orientation of liquid-crystal molecules. As an example, a liquid crystal spatial light modulator may be included in a liquid crystal display apparatus, a holographic display apparatus, a polarization rotator, a phase retarder, and the like.

However, in a liquid crystal spatial light modulator, a liquid crystal cell generally requires a thickness of several micrometers (um) in order to obtain an optical path that is sufficient enough to change a phase of light inside a liquid crystal. Because of this required thickness, a size of the electrodes must be large enough to provide a sufficient electric field for the liquid crystal cell.

Accordingly, it is difficult to reduce the size of pixels to prevent interference of electric fields between adjacent pixels. For example, a pixel pitch of the liquid crystal spatial light modulator may be equal to or higher than several um. Currently, studies for reducing the sizes of pixels of a spatial light modulator are being performed in an effort to produce a high-resolution holographic display apparatus.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

According to an aspect of an exemplary embodiment, there is provided a spatial light modulator including: a refractive index changing layer that includes a refractive index distribution that changes according to an electric field, and a pixel electrode and a common electrode which are configured to apply an electric field to the refractive index changing layer, at least one of the pixel electrode and the common electrode includes a nano-antenna pattern structure configured to resonate light.

The refractive index changing layer may include a material from among at least one of liquid crystal, potassium tantalite niobate (KTN), lithium niobate ($LiNbO_3$), and lead zirconate titanate (PZT).

The spatial light modulator may further include first and second transparent substrates which face each other, the refractive index changing layer may be disposed between the first and second transparent substrates, and the pixel electrode and the common electrode may each be arranged on the first transparent substrate and may each include the nano-antenna pattern structure.

The pixel electrode and the common electrode may each include a nano-antenna pattern structure, the nano-antenna pattern structure of the pixel electrode may include a plurality of nano-antennas that are arranged in parallel to each other, the nano-antenna pattern structure of the common electrode may include a plurality of nano-antennas arranged in parallel to each other, and the nano-antennas of the pixel electrode and the nano-antennas of the common electrode may be alternately arranged in an interdigitated manner.

At least one of an interval between two adjacent nano-antennas of the pixel electrode and an interval between two adjacent nano-antennas of the common electrode may be shorter than a resonance wavelength while a length thereof may be longer than $\frac{1}{3}$ of the resonance wavelength.

The pixel electrode and the common electrode may be formed of a conductive metal including at least one of gold (Au), silver (Ag), copper (Cu), and aluminum (Al).

The pixel electrode and the common electrode may include an embossed structure protruding from a surface of the first transparent substrate.

The pixel electrode and the common electrode may have an engraved structure embedded in a surface of the first transparent substrate.

The spatial light modulator may further include first and second transparent substrates which face each other, wherein the refractive index changing layer may be disposed between the first and second transparent substrates, the pixel electrode may be disposed on the first transparent substrate, the common electrode may be disposed on the second transparent substrate, and the pixel electrode may include the nano-antenna pattern structure.

The common electrode may be a transparent electrode.

The nano-antenna pattern structure of the pixel electrode may include an opening that is formed through the pixel electrode and which exposes the first transparent substrate, and a width and a length of the opening may be smaller than a resonance wavelength.

The common electrode may be partially formed in an area of the second transparent substrate, which faces the opening.

The nano-antenna pattern structure of the pixel electrode may include a convex nano-antenna pattern structure, and a width and a length of the convex nano-antenna pattern structure may be smaller than a resonance wavelength.

The nano-antenna pattern structure of the pixel electrode may include a concave nano-antenna pattern structure, and a width and a length of the concave nano-antenna pattern structure may be smaller than a resonance wavelength.

The spatial light modulator may further include a polarizing plate disposed on at least one of a light-incident surface and a light-exit surface of the spatial light modulator.

The refractive index changing layer may include a thickness between 20 to 500 nanometers.

The spatial light modulator may further include a substrate, and the nano-antenna pattern structure of the at least one of the pixel electrode and the common electrode may generate a surface plasmon resonance (SPR) at an interface with the substrate.

According to an aspect of another exemplary embodiment, there is provided a display apparatus including: a pixel array that includes a plurality of pixels that are two-dimensionally arranged, a backlight unit that transmits light to the pixel array, and a polarizing plate disposed on a light-incident surface or a light-exit surface of the pixel array, wherein the pixels include a refractive index changing layer, and a pixel electrode and a common electrode which are configured to apply an electric field to the refractive index changing layer, at least one of the pixel electrode and the common electrode includes a nano-antenna pattern structure configured to resonate light.

The pixel array may include a red pixel, a green pixel, and a blue pixel, wherein at least one of a pixel electrode and a common electrode disposed in the red pixel may include the nano-antenna pattern structure configured to resonate light in a red wavelength band, at least one of a pixel electrode and a common electrode disposed in the green pixel may include the nano-antenna pattern structure configured to resonate light in a green wavelength band, and at least one of a pixel electrode and a common electrode disposed in the blue pixel may include the nano-antenna pattern structure configured to resonate light in a blue wavelength band.

The backlight unit may provide red light, green light, and blue light to the red pixel, the green pixel, and the blue pixel, respectively.

The display apparatus may further include at least one of a lenticular lens sheet and a parallax barrier on a front surface of the pixel array.

The display apparatus may be a holographic display apparatus, and the backlight unit may transmit coherent light to the pixel array.

BRIEF DESCRIPTION OF THE DRAWINGS

The and/or other aspects will become apparent and more readily appreciated from the following description of exemplary embodiments, taken in conjunction with the accompanying drawings in which.

DETAILED DESCRIPTION

Figure 1:
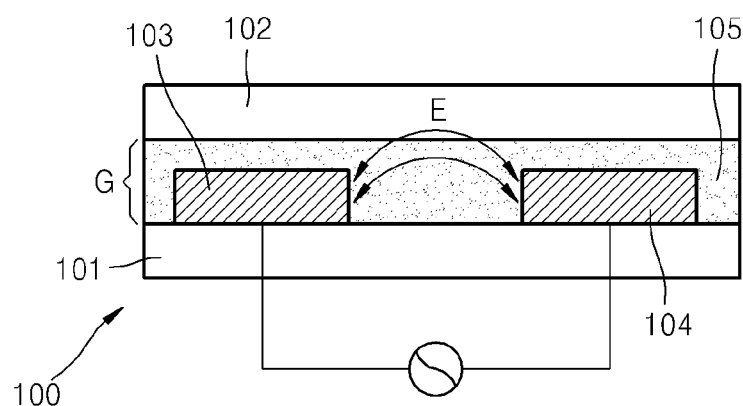
FIG. 1 is a cross-sectional diagram illustrating a spatial light modulator according to an exemplary embodiment.

Hereinafter, a spatial light modulator including a nano-antenna electrode and a display apparatus including the spatial light modulator, according to one or more exemplary embodiments are described with reference to the accompanying drawings. In the drawings, unless otherwise suggested like reference numerals refer to like elements and a size of each element may be exaggerated for clarity. In this regard, the present embodiments may have different forms and should not be construed as being limited to the descriptions set forth herein. Also, when a layer is disposed "above" or "on" another layer, the layer may be directly on the other layer or one or more intervening layers may be present.

FIG. 1 is a cross-sectional diagram illustrating a spatial light modulator 100 according to an exemplary embodiment. In particular, FIG. 1 illustrates a part of one cell of the spatial light modulator 100. Referring to FIG. 1, the spatial light modulator 100 includes a first transparent substrate 101 and a second transparent substrate 102, which face each other, a pixel electrode 103 and a common electrode 104, which are disposed on the first transparent substrate 101, and a refractive index changing layer 105 disposed between the first and second transparent substrates 101 and 102. For example, the refractive index changing layer 105 may be disposed on the first substrate 101, and the second substrate may be disposed on the refractive index changing layer 105.

The pixel electrode 103 and the common electrode 104 may apply an electric field to the refractive index changing layer 105. According to various aspects, the pixel electrode 103 and the common electrode 104 may include a nano-antenna pattern structure that resonates light at a certain wavelength band. Because the nano-antenna pattern has a nano structure that has a length that is shorter than a wavelength of light to be resonated, the nano-antenna pattern acts as or otherwise functions as an optical antenna having an antenna function with respect to light. Examples of light include not only visible light but also invisible light, such as infrared light or ultraviolet light, and may be based on purposes of the spatial light modulator 100.

As a non-limiting example, a cell gap (G) between the first and second transparent substrates may be or may approximately be 25 nanometers, 50 nanometers, 100 nanometers, 200 nanometers, and the like.

The pixel electrode 103 and the common electrode 104 may be excited by light at a certain wavelength band, and may generate surface plasmon resonance (SPR) at an interface with the first transparent substrate 101 that is a dielectric substance. The nano-antenna pattern of the pixel electrode 103 and the common electrode 104 may capture and excite energy of incident light through the SPR. In order to generate SPR, the pixel electrode 103 and the common electrode 104 having the nano-antenna pattern may be formed of a conductive metal, for example, gold (Au), silver (Ag), copper (Cu), aluminum (Al), and the like.

Figure 2:
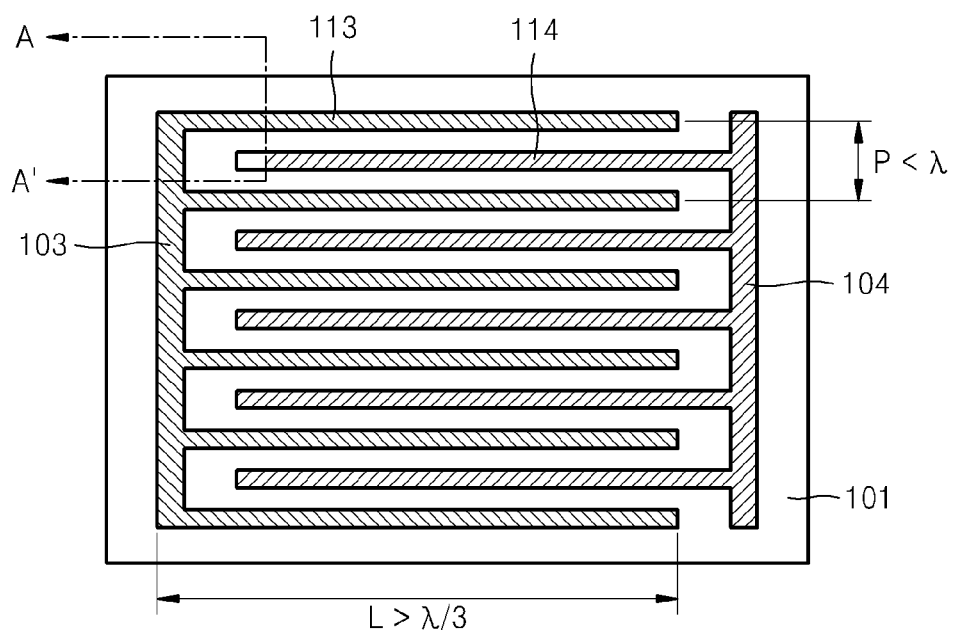
FIG. 2 is a diagram illustrating a nano-antenna pattern of a pixel electrode and a common electrode of the spatial light modulator of FIG. 1 according to an exemplary embodiment.

FIG. 2 is a diagram illustrating the nano-antenna pattern of the pixel electrode 103 and the common electrode 104 of the spatial light modulator 100 of FIG. 1. Referring to FIG. 2, the pixel electrode 103 includes a plurality of nano-antennas 113 arranged in parallel to each other, and the common electrode 104 also includes a plurality of nano-antennas 114 arranged in parallel to each other. As shown in FIG. 2, the nano-antennas 113 of the pixel electrode 103 and the nano-antennas 114 of the common electrode 104 are alternately arranged in an interdigitated shape similar to the shape of interlocking fingers.

FIG. 1 is the cross-sectional view taken along line A-A' of FIG. 2, and illustrates portions of the pixel electrode 103 and the common electrode 104. In FIG. 2, each of the nano-antennas 113 and 114 has a straight line shape, but it should be appreciated that shapes of the nano-antennas 113 and 114 may vary, for example, according to a desired resonance wavelength. Resonance wavelengths of the nano-antennas 113 and 114 may change based on pitches (P) and lengths (L) of the nano-antennas 113 and 114. For example, the pitches P of the nano-antennas 113 and 114 may be shorter than the resonance wavelengths (P<$\lambda$), and the length L of each of the nano-antennas 113 and 114 may be longer than $\frac{1}{3}$ of the resonance wavelengths (L>$\lambda$/3). The pitch P may be defined to be at an interval between two adjacent nano-antennas 113 of the pixel electrode 103 or at an interval between two adjacent nano-antennas 114 of the common electrode 104.

Because the pluralities of nano-antennas 113 and 114 that are formed of a conductive metal material are arranged in parallel to each other, the pixel electrode 103 and the common electrode 104 may function as a wire grid polarizer (WGP). Generally, a conductive grid diffracts light when a width of a slit in the conductive grid is greater than a wavelength of the light, however, the conductive grid still exhibits characteristics of a polarizer when the width of the slit is lower than the wavelength of the light. Also, the characteristics of the polarizer are strengthened and the diffraction of light decreases as the width of the slit is decreased.

For example, the WGP may transmit light that has a polarization component that is perpendicular to a direction of the slit, and may reflect light having a polarization component parallel to the direction of the slit. Accordingly, the pixel electrode 103 and the common electrode 104 may act as a polarizer that transmits light that has a polarization component that is perpendicular to directions of the lengths L of the nano-antennas 113 and 114 and which reflects light having a polarization component that is parallel to the directions of the lengths L of the nano-antennas 113 and 114.

The refractive index changing layer 105 may be formed of a material that includes a refractive index that changes according to a strength of an electric field. For example, the refractive index changing layer 105 may be formed of liquid crystal, potassium tantalite niobate (KTN), lithium niobate (LiNbO$_3$), lead zirconate titanate (PZT), and the like. A refractive index of the refractive index changing layer 105 formed of such a material may continuously change due to an electric field that is applied to the refractive index changing layer 105 by the pixel electrode 103 and the common electrode 104.

When light is incident on the spatial light modulator 100 having such a structure, light corresponding to the resonance wavelengths of the nano-antennas 113 and 114 may be absorbed by the nano-antennas 113 and 114 and the SPR may be generated. Also, light of other wavelength bands may be blocked and may not be transmitted through the pixel electrode 103 and the common electrode 104. In this example, when light in a resonating wavelength is emitted again, the light may have one same polarization component because the nano-antennas 113 and 114 are arranged in the same direction.

If a voltage applied to the pixel electrode 103 changes, the electric field generated inside the refractive index changing layer 105 may also change. Accordingly, a refractive index distribution of the refractive index changing layer 105 may also change. Because resonance characteristics of the nano-antennas 113 and 114 are affected by the ambient refractive indexes, a change in the refractive index distribution of the refractive index changing layer 105 may also affect a phase of light emitted from the nano-antennas 113 and 114. For example, the phase of light may be significantly changed by a change of the refractive index of the refractive index changing layer 105 in response to light being emitted from the nano-antennas 113 and 114. As a result, the phase may be significantly changed even though a thickness (G) of the refractive index changing layer 105 is small. As an example, a thickness G of the refractive index changing layer 105 may be from about 20 nanometers (nm) to about 500 nm.

The resonance characteristics of the nano-antennas 113 and 114 are affected by ambient refractive indexes. Accordingly, a change of the refractive index distribution of the refractive index changing layer 105 may also affect an intensity of light emitted from the nano-antennas 113 and 114. According to various aspects, the spatial light modulator 100 may be an amplitude and phase modulator capable of changing both a phase and intensity of light using the resonance characteristics of the nano-antennas 113 and 114. Furthermore, by disposing a polarizing plate on a light-incident surface or a light-exit surface of the spatial light modulator 100, a more accurate amplitude modulation effect may be obtained.

Figure 3:
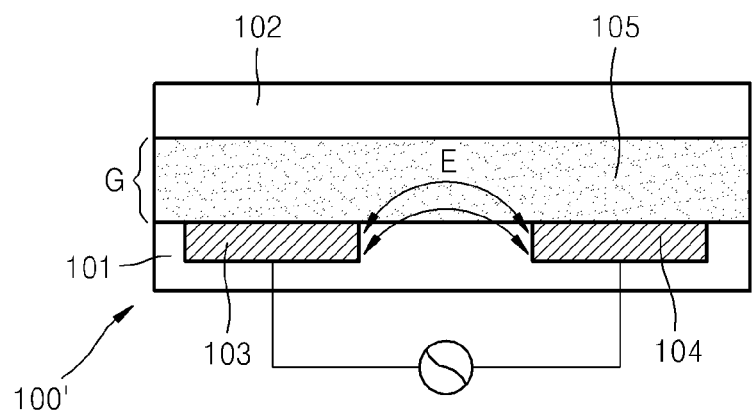
FIG. 3 is a cross-sectional diagram illustrating a spatial light modulator according to another exemplary embodiment.

FIG. 3 is a cross-sectional diagram illustrating a structure of a spatial light modulator 100', according to another exemplary embodiment. In this example, only a part of one cell of the spatial light modulator 100' is illustrated. In the spatial light modulator 100 of FIG. 1, the pixel electrode 103 and the common electrode 104 protrude from above a surface of the first transparent substrate 101. In other words, the pixel electrode 103 and the common electrode 104 of the spatial light modulator 100 have an embossing structure. In the example of the spatial light modulator 100' of FIG. 3, the pixel electrode 103 and the common electrode 104 are embedded inside the first transparent substrate 101. For example, as shown in FIG. 3, the pixel electrode 103 and the common electrode 104 may be engraved into a surface of the first transparent substrate 101.

In the spatial light modulators 100 and 100' of FIGS. 1 and 3, the pixel electrode 103 and the common electrode 104 may use an in-plane switching (IPS) method while being arranged on the first transparent substrate 101. As another example, the pixel electrode 103 and the common electrode 104 may be disposed on different substrates.

Figure 4:
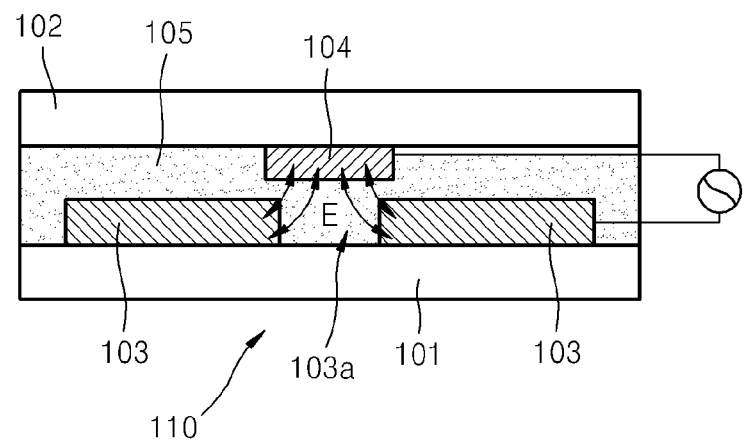
FIG. 4 is a cross-sectional diagram illustrating a spatial light modulator according to another example embodiment.

FIG. 4 is a cross-sectional diagram illustrating a spatial light modulator 110 according to another exemplary embodiment. Referring to FIG. 4, the spatial light modulator 110 includes the first and second transparent substrate 101 and 102, which face each other, the pixel electrode 103 disposed on the first transparent substrate 101, the common electrode 104 disposed on the second transparent substrate 102, and the refractive index changing layer 105 filled in between the first and second transparent substrates 101 and 102.

In this example, the pixel electrode 103 and the common electrode 104 are disposed on surfaces of the first and second transparent substrates 101 and 102 and are facing each other. In addition, in this example the pixel electrode 103 includes an opening 103a that is formed in the pixel electrode 103 such that the first transparent substrate 101 is exposed. That is, the pixel electrode 103 includes an opening 103a which exposes the surface of the first transparent substrate 101 to the refractive index changing layer 105.

For example, the common electrode 104 may be a transparent electrode that is formed of a transparent conductive oxide such as indium tin oxide (ITO), indium zinc oxide (IZO), aluminum zinc oxide (AZO), gallium zinc oxide (GZO), and the like. In some examples, the common electrode 104 may be formed throughout the second transparent substrate 102. As another example, the common electrode 104 may be formed only at an area of the second transparent substrate 102 that faces the opening 103a which may cause an electric field to concentrate at the opening 103a formed in the pixel electrode 103.

Figure 5:
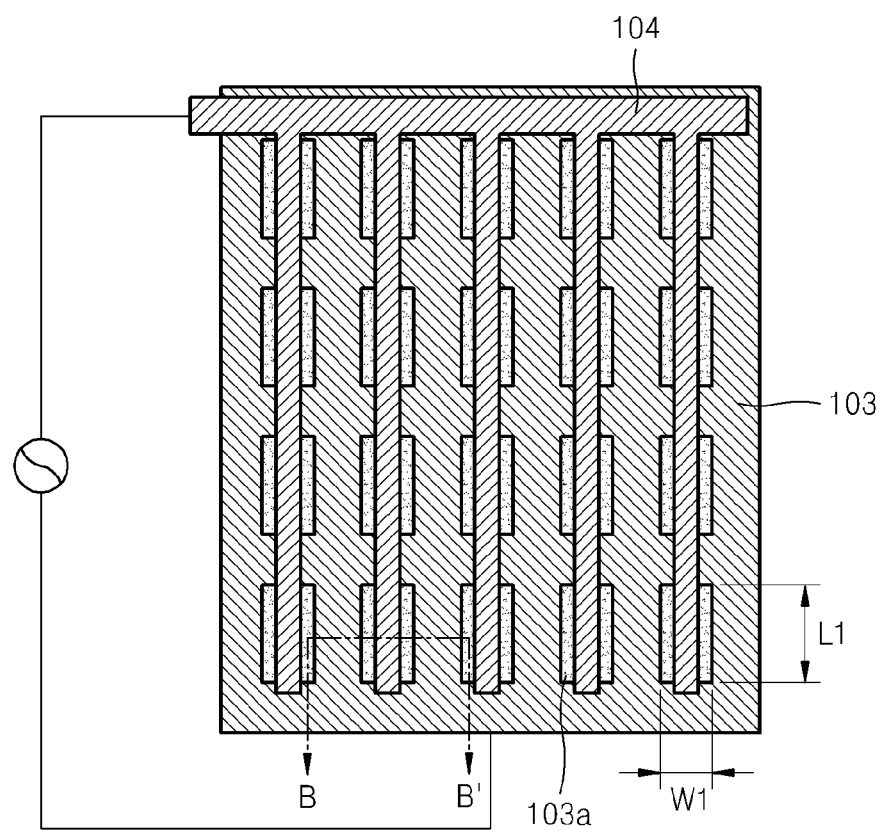
FIG. 5 is a diagram illustrating a nano-antenna pattern of a pixel electrode and a common electrode of the spatial light modulator of FIG. 4 according to an exemplary embodiment.

The opening 103a of the pixel electrode 103 may form a nano-antenna pattern that resonates light at a certain wavelength band. FIG. 5 is a diagram illustrating a nano-antenna pattern of the pixel electrode 103 of the spatial light modulator 110 of FIG. 4 according to an exemplary embodiment. Referring to FIG. 5, the pixel electrode 103 is formed in one cell, and includes a plurality of the openings 103a arranged in a two-dimensional (2D) array. Also, the common electrode 104 is disposed along each of the openings 103a in a column.

FIG. 4 is the cross-sectional diagram taken along line B-B' of FIG. 5, which illustrates portions of the pixel electrode 103 and the common electrode 104 of FIG. 5. In FIG. 5, the openings 103a are formed along a plurality of rows and a plurality of columns in a cell. As another example, the openings 103a may be formed along only one row or one column. Also, the opening 103a may have a rectangular shape, or may also include a circular shape, an oval shape, or another polygonal shape, and the like.

In such a structure, surface plasmons are generated at an interface between the pixel electrode 103 and the first transparent substrate 101 in response to the pixel electrode 103 being excited by light at a corresponding wavelength band. Also, only light corresponding to a resonance wavelength from among light that passes through the opening 103a may be transmitted to the refractive index changing layer 105 through a reaction that occurs with the surface plasmon. For example, light may be concentrated at the opening 103a of the pixel electrode 103. Also, a resonance wavelength may change according to sizes and arrangement of the openings 103a. For example, a width W1 and a length L1 of each opening 103a may be smaller than the resonance wavelength (W1<$\lambda$, L1<$\lambda$). As another example, the width W1 or the length L1 of one or more openings may be the same as or greater than the resonance wavelength.

The spatial light modulators 100, 100', and 110 described herein with reference to FIGS. 1 through 5 are transmissive spatial light modulators that transmit light. However, it should be appreciated that these examples may be applied not only to a transmissive spatial light modulator but also to a reflective spatial light modulator. For example, FIGS. 6 and 7 are cross-sectional views illustrating reflective spatial light modulators 120 and 130, according to exemplary embodiments, and in detail, illustrate only a part of one cell of the reflective spatial light modulators 120 and 130, respectively.

Figure 6:
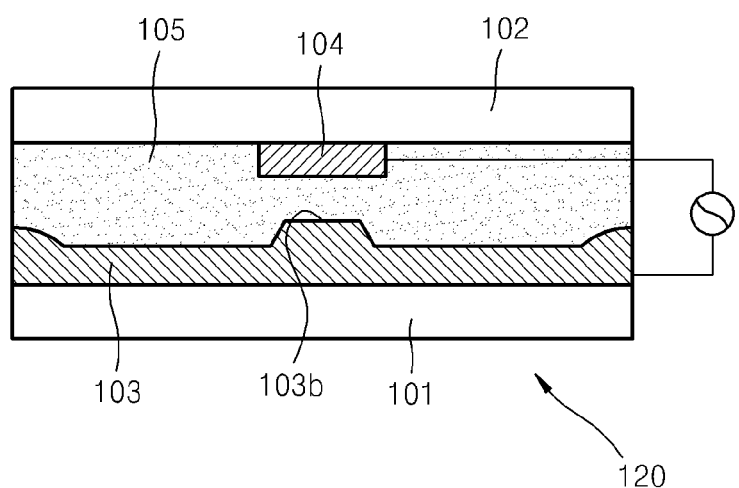
FIG. 6 is a cross-sectional diagram illustrating a reflective spatial light modulator according to an exemplary embodiment.

Referring to FIG. 6, the reflective spatial light modulator 120 includes the first and second transparent substrates 101 and 102, which face each other, the pixel electrode 103 disposed on the first transparent substrate 101, the common electrode 104 disposed on the second transparent substrate 102, and the refractive index changing layer 105 that is filled in between the first and second transparent substrates 101 and 102.

In this example, the pixel electrode 103 and the common electrode 104 are respectively disposed on two facing surfaces of the first transparent substrate 101 and the second transparent substrate 102. The common electrode 104 disposed on the second transparent substrate 102 may be a transparent electrode. The pixel electrode 103 is formed throughout one cell, and may operate as a reflective electrode that reflects light. In this example, the pixel electrode 103 includes a convex nano-antenna pattern 103b that resonates and reflects light at a certain wavelength. The convex nano-antenna patterns 103b may be arranged, for example, in a 2D array like the openings 103a of FIG. 5. It should also be appreciated that a wavelength of the reflected light, i.e., a resonance wavelength, may change according to an arrangement and sizes of the convex nano-antenna patterns 103b. A width and a length of each convex nano-antenna pattern 103b may be smaller than the resonance wavelength.

Figure 7:
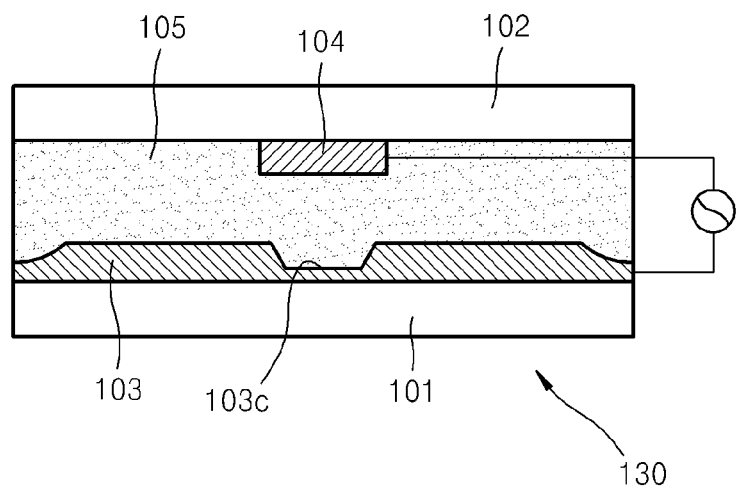
FIG. 7 is a cross-sectional diagram illustrating a reflective spatial light modulator according to another exemplary embodiment.

The reflective spatial light modulator 130 of FIG. 7 is different from the reflective spatial light modulator 120 of FIG. 6 in that the pixel electrode 103 of the reflective spatial light modulator 130 includes a concave nano-antenna pattern 103c. The concave nano-antenna patterns 103c of FIG. 7 may also be arranged in a 2D array, and a width and a length of each concave nano-antenna pattern 103c may be smaller than the resonance wavelength. Other features of the reflective spatial light modulator 130 of FIG. 7 are the same as the features of reflective spatial light modulator 120 of FIG. 6 described above.

According to various aspects, because a phase may be sufficiently changed even though the thickness of the refractive index changing layer 105 is small, the spatial light modulators 100, 100', and 110, and the reflective light modulators 120 and 130 may have a thickness that is smaller than a wavelength of light. Because the thicknesses of the spatial light modulators 100, 100', and 110, and the reflective light modulators 120 and 130 are small, the pitches P of the spatial light modulators 100, 100', and 110, and the reflective light modulators 120 and 130 may be lower than or equal to 1 um, for example, from 100 nm to 1 um. Accordingly, it is possible to manufacture a display apparatus that has a high resolution and a large area using the spatial light modulators 100, 100', and 110, and the reflective light modulators 120 and 130. Furthermore, because the thicknesses of the spatial light modulators 100, 100', and 110, and the reflective light modulators 120 and 130 is small, power consumption of the display apparatus may be increased and a driving speed of the display apparatus may also be increased. Also, because only light at a certain wavelength is resonated using a nano-antenna pattern, the display apparatus including the spatial light modulators 100, 100', and 110, and the reflective light modulators 120 and 130 according to embodiments may not use a color filter.

Figure 8:
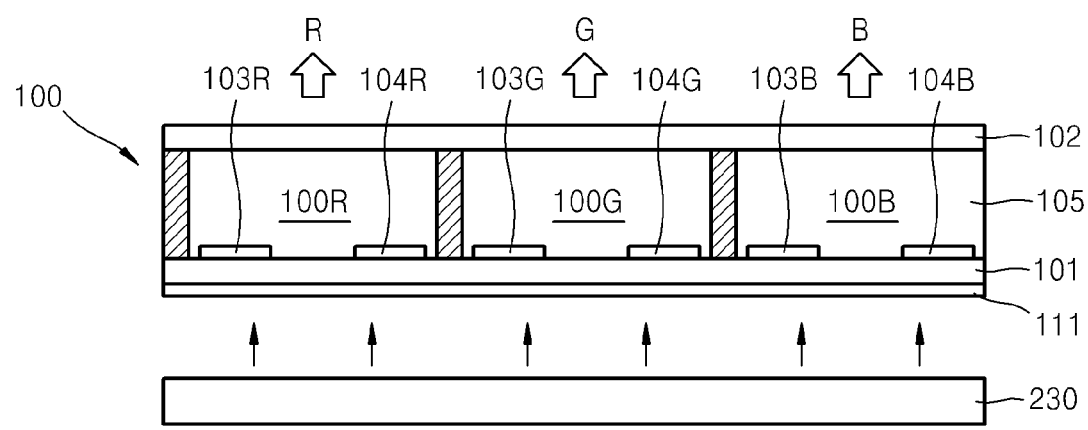
FIG. 8 is a cross-sectional diagram illustrating a display apparatus using the spatial light modulator of FIG. 1, according to an exemplary embodiment.

FIG. 8 is a cross-sectional diagram of a display apparatus 200 including the spatial light modulator 100 of FIG. 1, according to an exemplary embodiment. Referring to FIG. 8, the display apparatus 200 includes the spatial light modulator 100 that has a red sub-pixel 100R, a green sub-pixel 100G, and a blue sub-pixel 100B, a backlight unit 230 providing light to the spatial light modulator 100, and a polarizing plate 111 disposed on a light-incident surface of the spatial light modulator 100 facing the backlight unit 230.

In FIG. 8, one red sub-pixel 100R, one green sub-pixel 100G, and one blue sub-pixel 100B are illustrated for convenience, but it should be appreciated that a plurality of red, green, and blue sub-pixels 100R, 100G, and 100B may be arranged in a 2D array. For example, the spatial light modulator 100 may be a pixel array of the display apparatus 200. While the display apparatus 200 of FIG. 8 uses the spatial light modulator 100 of FIG. 1, the display apparatus 200 is not limited thereto. For example, the display apparatus 200 may use the transmissive spatial light modulator 100' or 110, the reflective spatial light modulator 120 or 130, and the like.

In this example, the backlight unit 230 of FIG. 8 may provide white light in which a red light component, a green light component, and a blue light component are mixed, to the spatial light modulator 100. For example, the backlight unit 230 may include a light-emitting diode (LED), a quantum dot LED, and the like, as a light source which emits white light including red, green, and blue components.

In the display apparatus 200 of FIG. 8, pixel electrode 103R and common electrode 104R of the red sub-pixel 100R may include a nano-antenna pattern that resonates light at a red wavelength band. Also, pixel electrode 103G and common electrode 104G of the green sub-pixel 100G may include a nano-antenna pattern that resonates light at a green wavelength band, and pixel electrode 103B and common electrode 104B of the blue sub-pixel 100B may include a nano-antenna pattern that resonates light at a blue wavelength band. As described above, a resonance wavelength of the nano-antenna patterns may be determined according to pitches, lengths, shapes, and the like, of the nano-antenna patterns. Therefore, it is possible to manufacture a display apparatus that has a high resolution without using a color filter, and thus, a light using efficiency of the display apparatus 200 may be increased.

Figure 9:
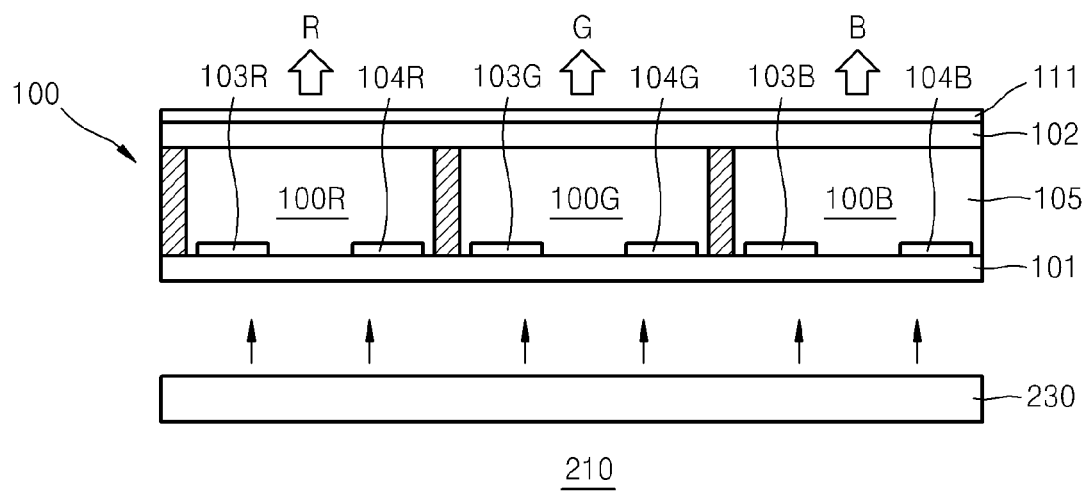
FIG. 9 is a cross-sectional diagram illustrating a display apparatus using the spatial light modulator of FIG. 1, according to another exemplary embodiment.

FIG. 9 is a cross-sectional diagram of a display apparatus 210 using the spatial light modulator 100 of FIG. 1, according to another exemplary embodiment. In comparison to the display apparatus 200 of FIG. 8, the polarizing plate 111 of the display apparatus 210 of FIG. 9 is disposed at a light-exit surface of the spatial light modulator 100. In contrast, in the display apparatus 200 of FIG. 8, the polarizing plate 111 is disposed on the first transparent substrate 101 through which light enters.

Figure 10:
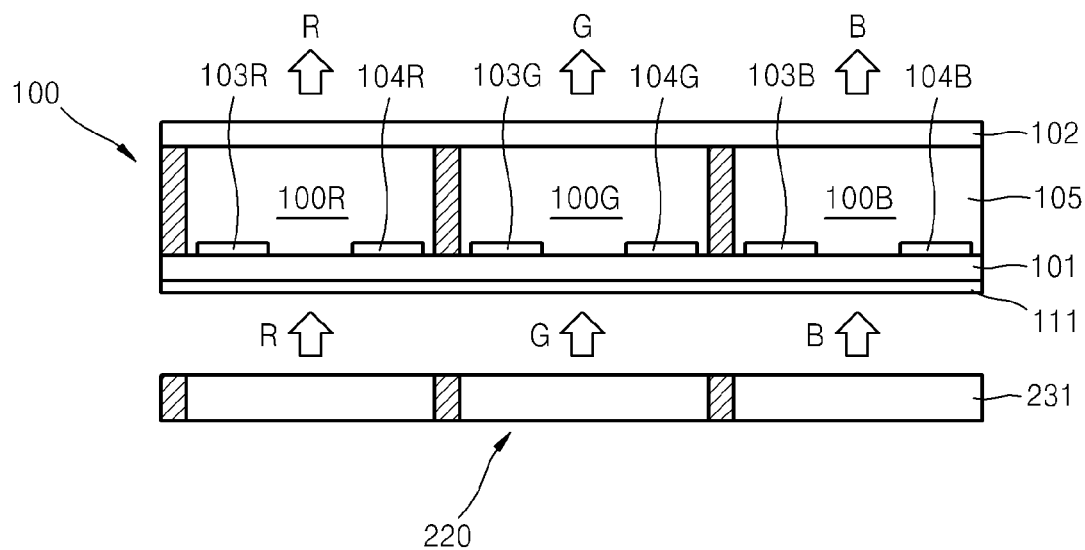
FIG. 10 is a cross-sectional diagram illustrating a display apparatus using the spatial light modulator of FIG. 1, according to another exemplary embodiment.

FIG. 10 is a cross-sectional diagram of a display apparatus 220 using the spatial light modulator 100 of FIG. 1, according to another exemplary embodiment. In comparison to the display apparatus 200 of FIG. 8, the display apparatus 220 of FIG. 10 includes a color backlight unit 231 instead of the backlight unit 230 that provides white light. The color backlight unit 231 may provide red light, green light, and blue light respectively to the red, green, and blue sub-pixels 100R, 100G, and 100B. For example, the color backlight unit 231 may use an LED, a quantum dot LED, and the like, as a light source. By using the color backlight unit 231, color clarity of the display apparatus 200 may be further increased.

In FIGS. 8 through 10, the display apparatuses 200 through 220 include the spatial light modulator 100 of FIG. 1, however, the display apparatuses are not limited thereto. For example, instead of the spatial light modulator 100 of FIG. 1, the display apparatuses 200 through 220 may include transmissive spatial light modulator 100' or 110 of FIG. 3 or 4, or the reflective spatial light modulator 120 or 130 of FIG. 6 or 7.

Because the display apparatuses 200 through 220 of FIGS. 8 through 10 have a very high resolution, a clear 3D image may be provided. For example, a 3D image may be provided in a stereoscopic manner by disposing a lenticular lens sheet or a parallax barrier in front of the display apparatuses 200 through 220 of FIGS. 8 through 10.

Figure 11A:
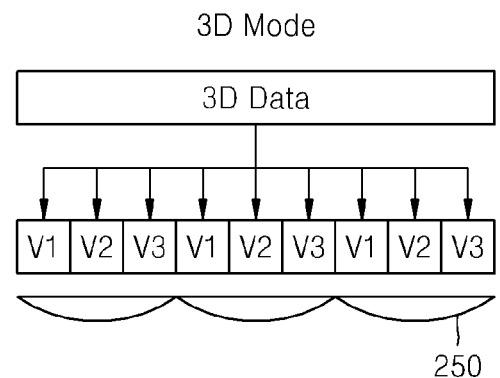
FIG. 11A is a diagram illustrating displaying three-dimensional (3D) data on pixels of a display apparatus according to an exemplary embodiment.

FIG. 11A illustrates images V1, V2, and V3 that have different viewpoints displayed on pixels of a display apparatus such as the display apparatuses 200 through 220 of FIGS. 8 through 10, in a 3D mode. For example, as shown in FIG. 11A, the plurality of pixels may alternately display the images V1 through V3 having different viewpoints and different parallaxes in a horizontal direction, and may project the images V1 through V3 in different viewing regions via a lenticular lens sheet 250. Accordingly, because the display apparatuses 200 through 220 may simultaneously display a large number of images V1 through V3 in different viewpoints, a natural 3D image may be displayed.

Figure 11B:
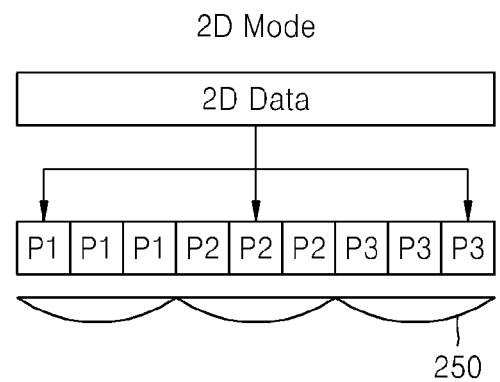
FIG. 11B is a diagram illustrating displaying two-dimensional (2D) data on the pixels of a display apparatus according to an exemplary embodiment.

FIG. 11B illustrates images P1, P2, and P3, that are displayed on pixels of a display apparatus such as the display apparatuses 200 through 220 of FIGS. 8 through 10, in a general 2D mode. The display apparatuses 200 through 220 may have a higher resolution than a general high-definition (HD) or full HD display. Accordingly, in order to display an HD or full HD 2D image, as shown in FIG. 11B, several adjacent pixels, for example, a plurality of pixels corresponding to one unit lens, may simultaneously display one piece of image information in a 2D mode.

Because an auto-stereoscopic method described with reference to FIG. 11A uses a binocular parallax, eyes may easily become tired and also the ability to provide a natural 3D effect may be limited. A holographic 3D image displaying technology is suggested as a way of providing a more natural full parallax, and the spatial light modulators 100, 100', and 110, and the reflective light modulators 120 and 130 described above may be applied to a holographic display apparatus. For example, in a general holographic display apparatus, an electrically addressable spatial light modulator (EASLM) and an optically addressed spatial light modulator (OASLM) may be simultaneously used due to a limitation in resolution of a spatial light modulator. However, because the space light modulators 100, 100', and 110, and the reflective light modulators 120 and 130 according to various aspects have a very high resolution, a holographic display apparatus may be provided in a very simple structure.

Figure 12:
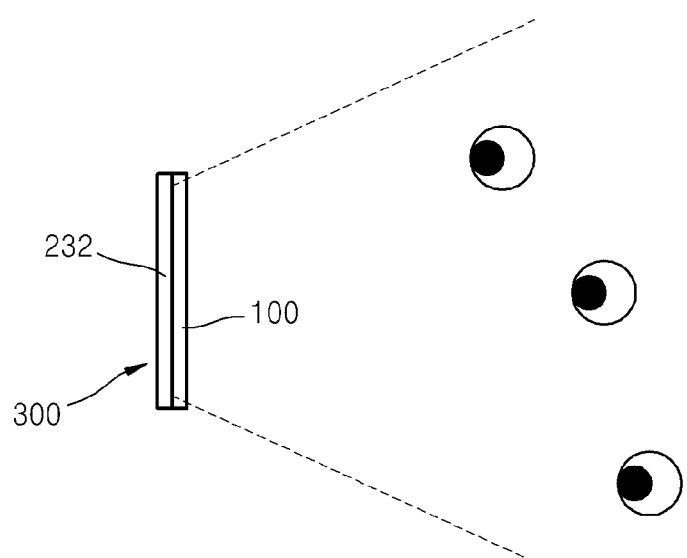
FIG. 12 is a diagram of a holographic display apparatus using the spatial light modulator of FIG. 1 according to an exemplary embodiment.

FIG. 12 is a diagram of a holographic display apparatus 300 using the spatial light modulator 100 of FIG. 1. Referring to FIG. 12, the holographic display apparatus 300 includes the spatial light modulator 100 and a backlight unit 232. For example, the backlight unit 232 may provide coherent light to the spatial light modulator 100. As another example, a hologram may be generated even if a single color of light is provided to each of the red, green, and blue sub-pixels 100R, 100G, and 100B of the spatial light modulator 100 using a light source such as an LED, a quantum dot light source, and the like.

To generate a hologram, the spatial light modulator 100 may form an interference pattern according to a hologram information signal. The hologram information may be obtained by directly exposing an original object to light, or may be computer generated hologram (CGH) information based on a 3D image to be displayed. The hologram information may be converted into an electrical information signal and provided to the spatial light modulator 100. The coherent light provided by the backlight unit 232 may be interfered by the interference pattern displayed in the spatial light modulator 100, and may form a 3D image on a space.

Because the holographic display apparatus 300 according to the current embodiment uses the spatial light modulator 100 that has a high resolution, interference light may not be concentrated within a certain space by using, for example, a Fourier lens. Accordingly, a position of a viewer capable of viewing a 3D image is not limited, and thus, a complex tracking apparatus for tracking the position of the viewer is not required.

According to various aspects, provided is a spatial light modulator including an electrode that has a nano-antenna structure capable of resonating light at a certain wavelength. By using the nano-antenna electrode, a phase of light sufficiently changes even though a thickness of a cell is decreased in comparison to a related liquid crystal cell. Accordingly, a thickness of the spatial light modulator may be smaller than a wavelength of light. Further, because the thickness of the modulator is decreased, a pixel pitch of the modulator may be small, for example, lower than or equal to 1 um. Accordingly, it is possible to manufacture a display apparatus that has a both a high resolution and a large display area.

While exemplary embodiments have been described with reference to the figures, it should be understood by those of ordinary skill that various changes in form and details may be made therein without departing from the spirit and scope of the present disclosure as defined by the following claims.

What is claimed is:

1. A spatial light modulator comprising:
a first transparent substrate and a second transparent substrate that face each other;
a refractive index changing layer which is disposed between the first transparent substrate and the second transparent substrate and has a refractive index distribution that changes according to an electric field; and
a nano-antenna pattern structure comprising a pixel electrode and a common electrode which are configured to apply the electric field to the refractive index changing layer, at least the pixel electrode being arranged on the first transparent substrate,
wherein the nano-antenna pattern structure is configured to resonate light and has an opening which is provided in the pixel electrode or between the pixel electrode and the common electrode, and which exposes the first transparent substrate to the refractive index changing layer.

2. The spatial light modulator of claim 1, wherein the refractive index changing layer comprises at least one of liquid crystal, potassium tantalite niobate (KTN), lithium niobate (LiNbO$_3$), and lead zirconate titanate (PZT).

3. The spatial light modulator of claim 1, wherein
the nano-antenna pattern structure of the pixel electrode comprises nano-antennas that are arranged in parallel to each other,
the nano-antenna pattern structure of the common electrode comprises nano-antennas arranged in parallel to each other, and
the nano-antennas of the pixel electrode and the nano-antennas of the common electrode are alternately arranged in an interdigitated manner.

4. The spatial light modulator of claim 1, wherein
the nano-antenna pattern structure of the pixel electrode comprises nano-antennas arranged in parallel to each other,
the nano-antenna pattern structure of the common electrode comprises nano-antennas arranged in parallel to each other,
at least one of an interval between two adjacent nano-antennas of the pixel electrode and an interval between two adjacent nano-antennas of the common electrode is shorter than a resonance wavelength while a length of each of the nano-antennas of the pixel electrode and the nano-antennas of the common electrode is longer than ⅓ of the resonance wavelength.

5. The spatial light modulator of claim 1, wherein the pixel electrode and the common electrode are formed of a conductive metal comprising at least one of gold (Au), silver (Ag), copper (Cu), and aluminum (Al).

6. The spatial light modulator of claim 1, further comprising a polarizing plate disposed on at least one of a light-incident surface and a light-exit surface of the spatial light modulator.

7. The spatial light modulator of claim 1, wherein the refractive index changing layer comprises a thickness between 20 to 500 nanometers.

8. The spatial light modulator of claim 1, wherein the nano-antenna pattern structure of the at least one of the pixel electrode and the common electrode is configured to generate a surface plasmon resonance (SPR) at an interface with the first transparent substrate and the refractive index changing layer.

9. The spatial light modulator of claim 1, wherein the common electrode is arranged on the first transparent substrate.

10. The spatial light modulator of claim 9, wherein the pixel electrode and the common electrode comprise an embossed structure protruding from a surface of the first transparent substrate into the refractive index changing layer, and
the opening is formed between the pixel electrode and the common electrode that are disposed within the refractive index changing layer.

11. The spatial light modulator of claim 9, wherein the pixel electrode and the common electrode comprise an engraved structure embedded in a surface of the first transparent substrate, and
the opening is formed between the pixel electrode and the common electrode that are disposed within the first transparent substrate.

12. The spatial light modulator of claim 9, wherein the common electrode comprises a transparent electrode.

13. The spatial light modulator of claim 9, wherein the opening is formed through the pixel electrode, and
a width and a length of the opening are smaller than a resonance wavelength.

14. A spatial light modulator comprising:
a refractive index changing layer having a refractive index distribution that changes according to an electric field;
a pixel electrode and a common electrode which are configured to apply the electric field to the refractive index changing layer, at least one of the pixel electrode and the common electrode comprising a nano-antenna pattern structure configured to resonate light; and
a first transparent substrate and a second transparent substrate that face each other,
wherein the refractive index changing layer is disposed between the first transparent substrate and the second transparent substrate,
the pixel electrode is disposed on the first transparent substrate and the common electrode is disposed on the second transparent substrate, and
the pixel electrode comprises the nano-antenna pattern structure,
the nano-antenna pattern structure of the pixel electrode comprises an opening that is formed through the pixel electrode and which exposes the first transparent substrate, and a width and a length of the opening are smaller than a resonance wavelength, and
the common electrode is partially formed in an area of the second transparent substrate which faces the opening.

15. A display apparatus comprising:
a pixel array that comprises a plurality of pixels that are two-dimensionally arranged;
a backlight configured to transmit light to the pixel array; and
a polarizing plate disposed on a light-incident surface or a light-exit surface of the pixel array,
wherein each of the plurality of pixels comprises:
 a first transparent substrate and a second transparent substrate that face each other,
 a refractive index changing layer which is disposed between the first transparent substrate and the second transparent substrate, and
 a nano-antenna pattern structure comprising a pixel electrode and a common electrode which are configured to apply an electric field to the refractive index changing layer, at least the pixel electrode being arranged on the first transparent substrate,
wherein the nano-antenna pattern structure is configured to resonate light and has an opening which is provided in the pixel electrode or between the pixel electrode and the common electrode, and which exposes the first transparent substrate to the refractive index changing layer.

16. The display apparatus of claim 15, wherein the pixel array comprises a red pixel, a green pixel, and a blue pixel,
the nano-antenna pattern structure of the pixel electrode and the common electrode that are disposed in the red pixel is configured to resonate the light at a red wavelength band,
the nano-antenna pattern structure of the pixel electrode and the common electrode that are disposed in the green pixel is configured to resonate the light at a green wavelength band, and
the nano-antenna pattern structure of the pixel electrode and the common electrode that are disposed in the blue pixel is configured to resonate the light at a blue wavelength band.

17. The display apparatus of claim 15, further comprising a lenticular lens sheet or a parallax barrier disposed on a front surface of the pixel array.

18. The display apparatus of claim 15, wherein the display apparatus comprises a holographic display apparatus, and the backlight is configured to transmit coherent light to the pixel array.

19. The display apparatus of claim 16, wherein the backlight is configured to transmit red light, green light, and blue light to the red pixel, the green pixel, and the blue pixel, respectively.

* * * * *